United States Patent
Jia et al.

(10) Patent No.: US 9,323,314 B1
(45) Date of Patent: Apr. 26, 2016

(54) SYSTEM AND METHOD FOR REDUCING ENERGY USAGE IN A MOBILE COMMUNICATIONS DEVICE

(71) Applicant: Marvell International Ltd., Hamilton (BM)

(72) Inventors: Zhike Jia, Fremont, CA (US); Xing Zhao, Santa Clara, CA (US); Thandapani Venkataramani, Fremont, CA (US); Mobo Qiu, Shanghai (CN); Xin Zhang, Shanghai (CN); Liujun Shao, Shanghai (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/704,065

(22) Filed: May 5, 2015

Related U.S. Application Data (60) Provisional application No. 61/989,710, filed on May 7, 2014.

(51) Int. Cl.
  *G06F 1/32* (2006.01)
  *G06F 9/48* (2006.01)

(52) U.S. Cl.
  CPC ............ *G06F 1/3234* (2013.01); *G06F 1/3296* (2013.01); *G06F 9/4881* (2013.01)

(58) Field of Classification Search
  None
  See application file for complete search history.

(56) References Cited

U.S. PATENT DOCUMENTS

| | | | |
|---|---|---|---|
| 8,706,172 B2 | 4/2014 | Priyantha et al. | |
| 2014/0274203 A1* | 9/2014 | Ganong, III | H04W 52/0251 455/556.1 |
| 2014/0274211 A1* | 9/2014 | Sejnoha | H04M 1/72519 455/563 |
| 2014/0278435 A1* | 9/2014 | Ganong, III | G10L 15/22 704/275 |

\* cited by examiner

*Primary Examiner* — Diane Mizrahi (57) ABSTRACT

A mobile communications device and a method for reducing energy usage in a mobile communications device are provided. An example mobile communications device includes an application processor. The application processor includes a first central processing unit (CPU), where the first CPU consumes a relatively high amount of power when operating in an active mode. The mobile communications device includes a microcontroller coupled to the application processor. The microcontroller includes a sensor subsystem configured to process, using a second CPU, first data received from one or more sensors. The second CPU consumes a relatively low amount of power when operating in an active mode. The microcontroller includes a location subsystem configured to receive satellite signals and process, using the second CPU, second data that is based on the received satellite signals. The first CPU operates in a sleep mode during the processing of the first and second data.

20 Claims, 7 Drawing Sheets

SYSTEM AND METHOD FOR REDUCING ENERGY USAGE IN A MOBILE COMMUNICATIONS DEVICE

CROSS-REFERENCE TO RELATED APPLICATIONS

This disclosure claims priority to U.S. Provisional Patent Application No. 61/989,710, filed on May 7, 2014, which is incorporated herein by reference in its entirety.

TECHNICAL FIELD

The technology described in this document relates generally to mobile communications devices and more particularly to systems and methods for reducing energy usage in a mobile communications device.

BACKGROUND

Modern mobile communications devices (e.g., smartphones, tablet computers, etc.) are configured to provide a wide array of functionality. For example, a mobile communications device may include components that implement a Global Navigation Satellite System (GNSS) receiver. The GNSS receiver may be used to provide, for example, a position of the mobile communications device and a velocity of the mobile communications device. Modern mobile communications devices may alternatively determine a position and/or velocity of the device using data received from motion sensors, a received WiFi signal, and/or a received cellular signal, among other sources. Mobile communications devices may also include a variety of built-in sensors that enable the monitoring of various physical phenomena on and around the device. Such sensors include motion sensors (e.g., accelerometer, gyroscope, magnetometer, etc.) and environmental sensors (e.g., barometer sensor, temperature sensor, proximity sensor, ambient light sensor, etc.), among others. Software applications that are executed within the mobile communications device process the data generated by these sensors.

SUMMARY

The present disclosure is directed to a mobile communications device and a method for reducing energy usage in a mobile communications device. An example mobile communications device includes an application processor. The application processor includes a first central processing unit (CPU), where the first CPU consumes a relatively high amount of power when operating in an active mode. The mobile communications device also includes a microcontroller coupled to the application processor. The microcontroller includes a sensor subsystem configured to process, using a second CPU, first data received from one or more sensors. The second CPU is different from the first CPU and consumes a relatively low amount of power when operating in an active mode. The microcontroller also includes a location subsystem configured to (i) receive signals from one or more satellites, and (ii) process, using the second CPU, second data that is based on the received signals. The first CPU is configured to operate in a sleep mode during the processing of the first data and the second data using the second CPU.

In another example, in an example method for reducing energy usage in a mobile communications device, first data is received from one or more sensors. Signals are received from one or more satellites. The first data is processed using the first CPU of the mobile communications device, where the first CPU consumes a relatively low amount of power when operating in an active mode. Second data that is based on the received signals is processed using the first CPU. A second CPU of the mobile communications device is operated in a sleep mode during the processing of the first data and the second data using the first CPU. The second CPU consumes a relatively high amount of power when operating in an active mode.

DETAILED DESCRIPTION

Figure 1:
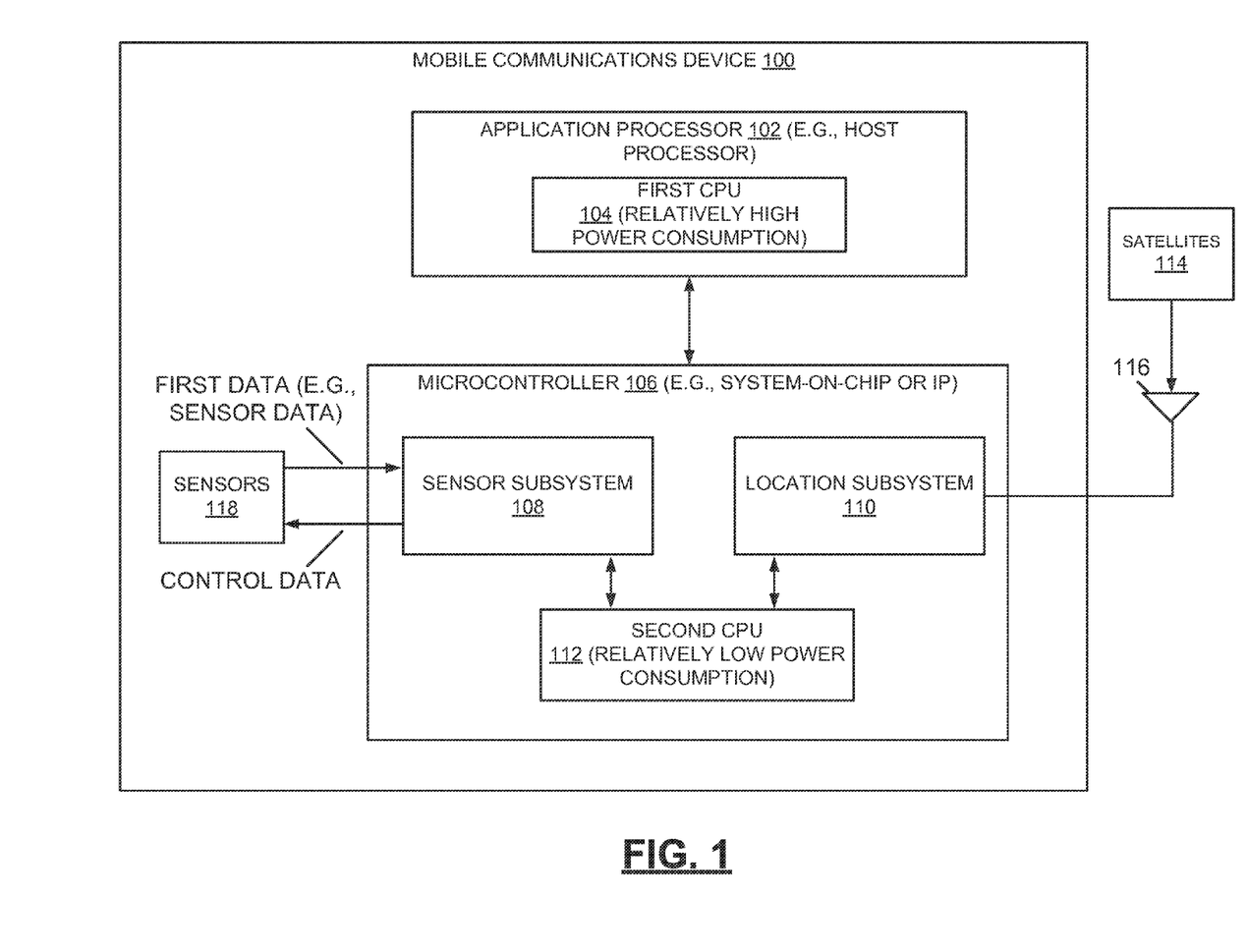
FIG. 1 depicts an example mobile communications device including a microcontroller with sensor subsystem and location subsystem components.

FIG. 1 depicts an example mobile communications device 100 including a microcontroller 106 with sensor subsystem 108 and location subsystem 110 components. The architecture of the mobile communications device 100, as described herein, enables the device 100 to include both sensing functionality and position-determining functionality while conserving energy in the device 100. In an example, the sensing functionality enables the monitoring of various physical phenomena on and around the device 100. The position-determining functionality is used to determine, for example, a position of the device 100 and a velocity of the device 100, among other information.

Energy conservation is achieved by the use of a central processing unit (CPU) 112 that consumes a relatively low amount of power when operating in an active mode. As described in further detail below, the CPU 112 is configured to process (i) first data received from one or more sensors 118 (e.g., sensor readings indicative of a movement of the device 100 or an environment in which the device 100 is operating), and (ii) second data that is based on one or more signals received from satellites 114. During the processing of the first and second data, a CPU 104 of the device 100 is configured to operate in a sleep mode (e.g., an idle state, low-power mode, non-active mode, off mode, etc.). The CPU 104 consumes a relatively high amount of power when operating in the active mode. The architecture of the mobile communications device 100 thus offloads processing of the first and second data from the CPU 104 to the CPU 112, allowing the CPU 104 to remain in the sleep mode until needed. Because the CPU 112 consumes less power than the CPU 104, energy usage is reduced in the device 100.

As illustrated in FIG. 1, the mobile communications device 100 includes an application processor (e.g., a host processor) 102. Integrated within the application processor 102 is the first CPU 104. In an example, the application processor 102 is disposed on a chip or integrated circuit and is configured to support applications running on the device 100 (e.g., by executing program code of the applications using the first CPU 104). The application processor 102 comprises a system-on-a-chip (SOC) in an example. The first CPU 104 of the application processor 102 executes an operating system (e.g., the Android operating system) that provides system capabilities needed to support the device's applications, including memory management, graphics processing, a graphical user interface, and multimedia decoding, among others. The mobile communications device 100 may be, for example, a mobile phone (e.g., a smartphone) or another mobile communications device (e.g., a tablet computer, laptop computer, etc.).

The mobile communications device 100 of FIG. 1 also includes a microcontroller 106 coupled to the application processor 102. As used herein, the term "microcontroller" refers to a device (e.g., a chip, SOC, Intellectual Property (IP) core, etc.) that includes a CPU and other hardware resources (e.g., memory, analog-to-digital converter, etc.). In an example, the application processor 102 is disposed on a first chip, and the microcontroller 106 is implemented as a standalone SOC that is separate from and coupled to the first chip. In another example, the application processor 102 is disposed on a chip, and the microprocessor 106 is implemented as an IP core that is disposed on the same chip or on another chip.

The microcontroller 106 includes a sensor subsystem 108 that is configured to (i) receive first data (e.g., sensor data) from one or more sensors 118, and (ii) process the first data. The sensor subsystem 108 may be known as a "sensor hub." In an example, the one or more sensors 118 include one or more of an accelerometer, gyroscope, magnetometer, barometer sensor, temperature sensor, proximity sensor, and ambient light sensor, among other types of motion and environmental sensors. The sensor subsystem 108 processes the first data using the second CPU 112, which is included as part of the microcontroller 106. The sensor subsystem 108 is implemented in hardware or in a combination of hardware and program code (e.g., software or firmware executed in the second CPU 112), in various examples. In another example, the sensor subsystem 108 is implemental entirely in software or firmware.

In an example, the sensor subsystem 108 is configured to periodically or continuously read and process the first data from the one or more sensors 118 without intervention from the application processor 102 and without waking the first CPU 104 from a sleep mode. In another example, the sensor subsystem 108 is configured to (i) sample the first data from the one or more sensors 118, (ii) process the first data using the second CPU 112, and (iii) transmit to the one or more sensors 118 control data used to control an operation of the one or more sensors 118. Such control data enables and disables an individual sensor or all sensors and controls sensor data collection parameters (e.g., frequency of collection), in an example. The sampling, processing, and transmitting are performed without intervention or assistance from the application processor 102 and without waking the first CPU 104 from the sleep mode, in an embodiment.

Figure 3:
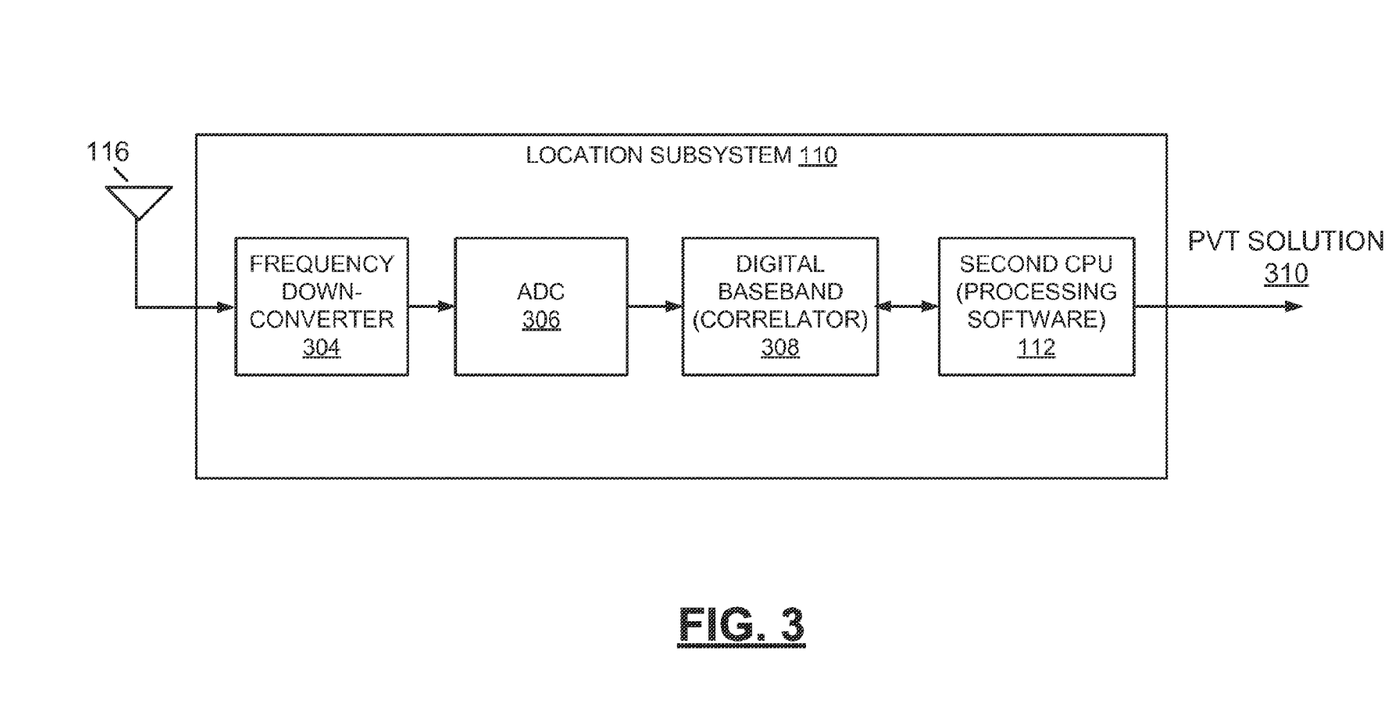
FIG. 3 is a block diagram illustrating additional details of the location subsystem of FIGS. 1 and 2.
Figure 5:
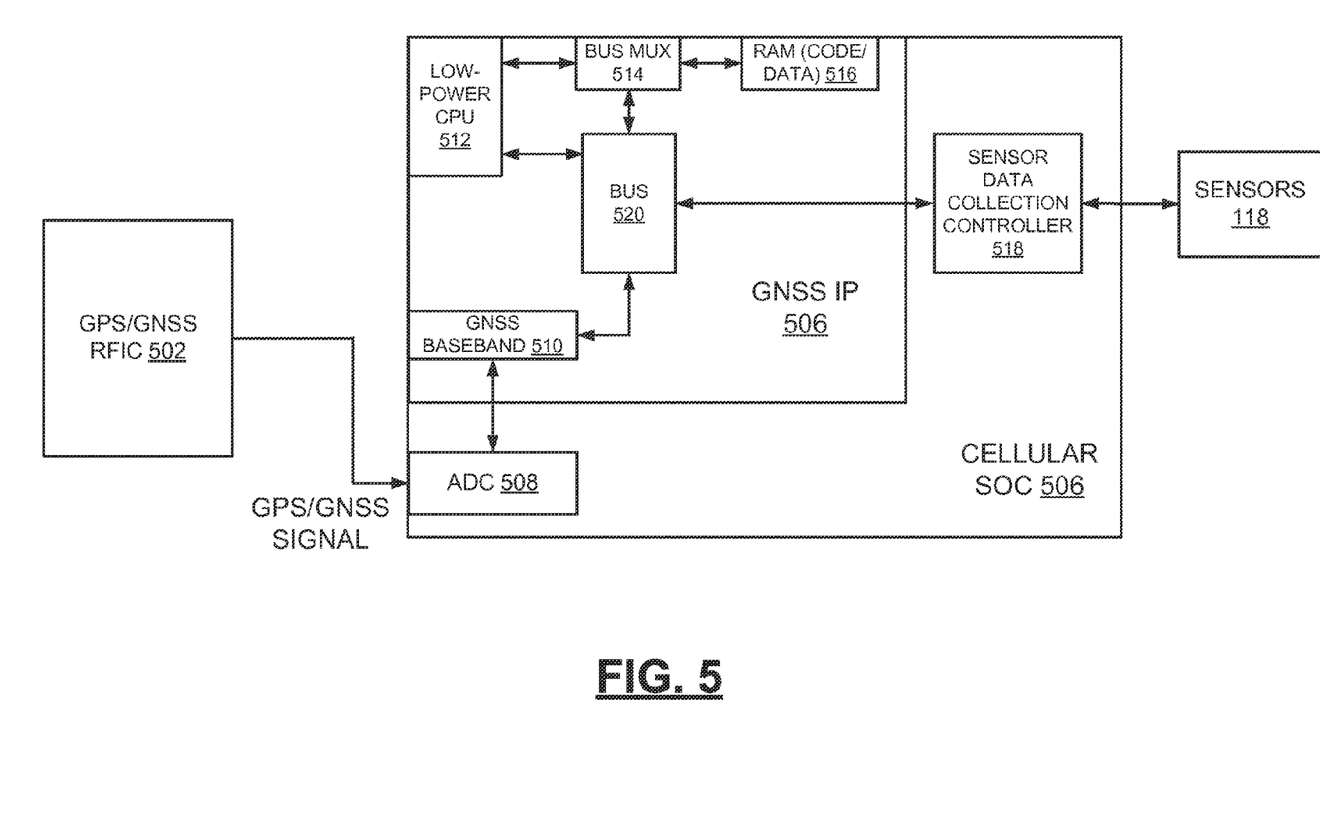
FIG. 5 depicts a system-on-chip (SOC) including exemplary components for implementing the sensor subsystem and location subsystem described herein.

The microcontroller 106 further includes a location subsystem 110. The location subsystem 110 may be known as a "GNSS engine" or a "GNSS measurement engine." The location subsystem 110 is configured to (i) receive signals from one or more satellites 114 (e.g., via an antenna 116 of the mobile communications device 100), and (ii) process second data that is based on the received satellite signals. The location subsystem 110 processes the second data using the second CPU 112. In an example, the processing of the second data by the second CPU 112 is used to determine a position of the mobile communications device 100 or intermediate data that is indicative of the position of the mobile communications device 100. The location subsystem 110 is implemented in hardware or in a combination of hardware and program code (e.g., software or firmware executed in the second CPU 112) in various examples. Exemplary hardware used in implementing the location subsystem 110 is illustrated in FIGS. 3 and 5 and described herein.

In an example, the location subsystem 110 is configured to determine the position of the mobile communications device 100 based on the processing of the second data using the second CPU 112, with the position being determined without intervention or assistance from the application processor 102 or the first CPU 104. In another example, the processing of the second data by the sensor subsystem 108 does not result in a final position of the device 100 but is instead used in generating intermediate data that is indicative of the position of the device 100. Additional processing of the intermediate data (e.g., additional processing performed by the first CPU 104 of the application processor 102) is used to determine the final position of the device 100, in an embodiment. In another example, the location subsystem 110 is configured to determine the position of the mobile communications device 100 based on (i) the processing of the second data using the second CPU 112, and (ii) additional information or assistance from the application processor 102.

The mobile communications device 100 includes a power source and/or battery from which the application processor 102 and the microcontroller 106 draw power. As explained above, first CPU 104 of the application processor 102 consumes a relatively high amount of power when operating in an active mode, and the second CPU 112 of the microcontroller 106 consumes a relatively low amount of power when operating in an active mode. To enable sensing functionality while conserving energy in the device 100, the architecture described herein offloads sensor sampling and processing of sensor data from the first CPU 104 to the second CPU 112. By decoupling the first CPU 104 of the application processor 102 from the sensors 118 and offloading sampling and processing of sensor data to the second CPU 112, the first CPU 104 can remain in a sleep mode until needed.

In an example, the sensor subsystem 108 is configured to periodically and/or continuously sample sensor data from the sensors 118 and process the sampled data using the second CPU 112 without waking the first CPU 104. The processing of the sampled data includes various types of low-level processing (e.g., continuous, "always on" sensor processing, such as step detection or motion detection, etc.) of the data, in an embodiment. After the reading and processing of the sensor data, the first CPU 104 is removed from the sleep state and used in processing the sensor data and/or results of the processing of the sensor data, in an embodiment. In this example, the first CPU 104 is only removed from the sleep state when it is necessary for the first CPU 104 to perform the processing of the sensor data and/or the results, and the first CPU 104 otherwise remains in the sleep state in order to conserve power in the device 100.

In a similar manner, the architecture described herein enables position-determining functionality while conserving energy in the device 100. Specifically, receiving satellite signals from the antenna 116 and processing data derived from the satellite signals is offloaded from the first CPU 104 to the second CPU 112. By decoupling the first CPU 104 of the application processor 102 from the antenna 116 and offloading the processing of the satellite data to the second CPU 112, the first CPU 104 can remain in a sleep mode until needed.

The location subsystem 110 is configured to periodically and/or continuously receive data derived from satellite signals and process the data using the second CPU 112 without waking the first CPU 104. After the processing of this data in the second CPU 112, the first CPU 104 is removed from the sleep state and used in processing the satellite data and/or results of the processing of the satellite data, in an embodiment. In this example, the first CPU 104 is only removed from the sleep state when it is necessary for the first CPU to perform the processing of the satellite data and/or the results, and the first CPU 104 otherwise remains in the sleep state in order to conserve power in the device 100.

In an example, the sensor subsystem 108 and the location subsystem 110 are configured to perform initial processing of the first data and the second data, respectively, using the second CPU 112. After the initial processing, the sensor subsystem 108 and the location subsystem 110 are respectively configured to transmit results of the initial processing to the application processor 102. The application processor 102 wakes the first CPU 104 from its sleep mode, causing the first CPU 104 to transition to an active mode. In the active mode, the first CPU 104 performs additional processing of the results received from the sensor subsystem 108 and the location subsystem 110. In this manner, the first CPU 104 remains in the sleep mode until it is necessary to perform the additional processing. For example, the location subsystem 110 is configured to (i) generate intermediate data based on the processing of the second data in the second CPU 112, and (ii) transmit to the application processor 102 the intermediate data. The application processor 102 is configured to (i) wake the first CPU 104 from the sleep mode, and (ii) determine a final position of the mobile communications device 100 by processing the intermediate data using the first CPU 104.

The mobile communications device architecture described herein differs from conventional architectures that do not utilize the microcontroller 106 to conserve energy in the mobile communications device. In the conventional architectures, a primary processor or CPU of the mobile communications device directly interfaces with sensors and/or satellite antennas of the mobile communications device. The primary processor or CPU (i) samples data from these sources, and (ii) performs all processing of the received data. The primary processor or CPU also transmits control signals to the sensors for controlling the sensors, in an example. Consequently, the primary processor or CPU must stay on during all of the sampling, processing, and transmitting. The primary processor or CPU generally consumes a relatively high amount of power when in operation (i.e., when not in a sleep mode), and this energy expenditure significantly limits a battery life of the mobile communications device. The battery life may be particularly limited when the sensor data or satellite data must be sampled continuously or periodically at a high frequency.

By contrast, in the mobile communications device 100 described herein, sampling and processing of sensor data and satellite data is offloaded to a CPU (e.g., the second CPU 112) that consumes a relatively low amount of power when in operation, thus allowing a primary CPU (e.g., the first CPU 104) to remain in a sleep mode until needed. This allows energy usage to be reduced in the mobile communications device 100.

Figure 2:
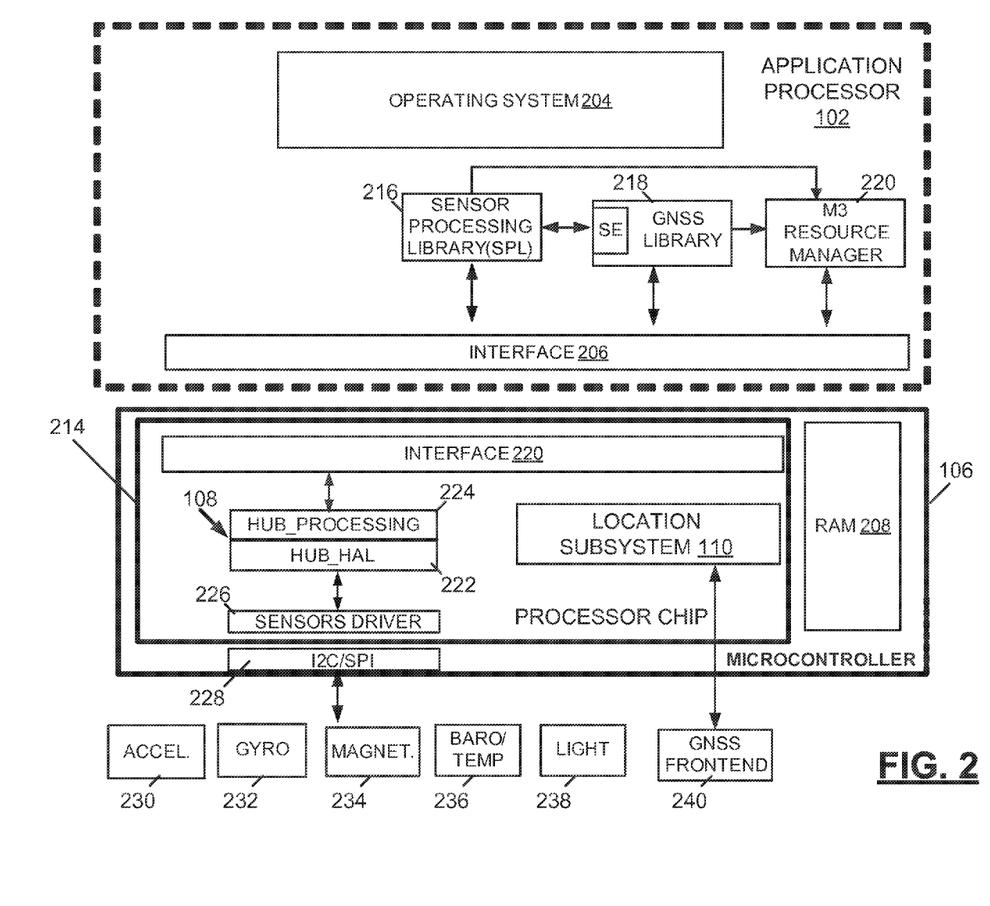
FIG. 2 is a block diagram illustrating additional details of the application processor and the microcontroller of FIG. 1.

FIG. 2 is a block diagram illustrating additional details of the application processor 102 and the microcontroller 106 of FIG. 1. In an example, the application processor 102 is a mobile communications device processor that is used to execute an operating system 204. The operating system 204 provides system capabilities needed to support the device's applications (e.g., memory management, graphics processing, graphical user interface provided via a UI module, multimedia decoding, etc.). As illustrated in FIG. 2, the operating system 204 runs on the application processor 102, which includes the primary CPU of the mobile communications device. With reference to FIG. 1, the primary CPU of the mobile communications device is the first CPU 104, described above as being a CPU that consumes a relatively high amount of power when active. Various software applications run on the operating system 204, in an embodiment. The application processor 102 further includes or interfaces with typical communications hardware found on the mobile communications device (e.g., display, speaker, microphone, keypad, user interface, etc.).

The application processor also includes a sensor processing library (SPL) 216, GNSS library 218, and M3 resource manager 220. The SPL 216 includes program code (e.g., software) for processing sensor data and results (e.g., initial results of processing sensor data) received from the microcontroller 106. As described above, the sensor subsystem 108 of the microcontroller 106 is responsible for sampling data from the one or more sensors 118 and performing low-level processing on the sampled data using the second CPU 112. The microcontroller 106 is configured to transmit the sampled data and/or results of the low-level processing to the application processor 102, where further processing of the received data takes place. Such further processing of the sensor data and/or the results in the application processor 102 utilizes the program code of the SPL 216, in an example. The SPL 216 includes program code to process and combine results received from all types of sensors (e.g., physical and virtual sensor types), in an embodiment. In an example, the SPL 216 also includes program code for decompressing sensor data and parsing raw sensor data. The SPL 216 further includes program code for implementing a Sensor Engine Manager (SEM), in an example. The SEM is software that controls sensor-hub related logic between the application processor 102 and the microcontroller 106. In an example, the first CPU 104 of the application processor 102 executes the program code of the SPL 216.

The GNSS library 218 includes program code and/or data used in providing GNSS positioning information, in an example. The GNSS library 218 also includes program code and/or data used in providing satellite measurement information (e.g., including track and acquire information, among other information). As described above, the location subsystem 110 of the microcontroller 106 is responsible for receiving signals from one or more satellites 114 and processing data derived from the received satellite signals using the second CPU 112. In an example, the location subsystem 110 determines a position of the mobile communications device based on the processing of the data and additional data received from the application processor 102. The additional data used in determining the position in the location subsystem 110 includes GNSS positioning information from the GNSS library 218, in an embodiment.

In another example, the location subsystem 110 does not determine a position of the mobile communications device but instead processes the satellite data using the second CPU 112 to generate intermediate results. The microcontroller 106 is configured to transmit the intermediate results to the application processor 102, where further processing of the intermediate results takes place. Such further processing of the intermediate data in the application processor 102 utilizes the program code and/or data of the GNSS library 218, in an embodiment. The GNSS library 218 thus includes program code and/or data used in processing the intermediate results to determine a final position of the mobile communications device, in an example. The first CPU 104 of the application processor 102 executes the program code of the GNSS library 218, in an embodiment.

The M3 resource manager 220 is responsible for GNSS and SensorHub Image download and control. The M3 resource manager 220 is used in managing and controlling the microcontroller 106 module. The M3 resource manager 220 supports GNSS and SensorHub image download to the microcontroller 106 from the application processor 102. The M3 resource manager 220 also controls the power on/off on the microcontroller 106 and provides an interface to query the power state of the microcontroller 106.

As illustrated in FIG. 2, the SPL 216, GNSS library 218, and M3 resource manger 220 components of the application processor 102 are coupled to an interface 206. The microcontroller 106 includes a corresponding interface 220. The interfaces 206, 220 are UART interfaces, socket interfaces, or other types of interfaces, in examples. Communications between the application processor 102 and the microcontroller 106 occur via the interfaces 206, 220, with such communications enabling both data transfer and exchange of control data between the application processor 102 and the microcontroller 106.

The microcontroller 106 includes the sensor subsystem 108 and location subsystem 110 described above with reference to FIG. 1. In an example, the microprocessor 106 comprises a single chip (e.g., a single SOC) or a single IP that integrates both the sensor subsystem 108 (e.g., sensor hub or sensor processor) and location subsystem 110 (e.g., GNSS engine or GNSS/location processor). In an example, the sensor subsystem 108 and the location subsystem 110 are respectively configured to operate independently of each other. Thus, for example, each of the sensor subsystem 108 and the location subsystem 110 is configured to be disabled without affecting operation of the other subsystem.

The microcontroller 106 also includes a low-power CPU for processing data received from the sensor subsystem 108 and the location subsystem 110. With reference to FIG. 1, the second CPU 112, described above as consuming a relatively low amount of power when operating in an active mode, is an example of the low-power CPU. In FIG. 2, the low-power CPU is implemented as one or more integrated circuits disposed at least on a chip 214. In an example, the chip 214 comprises an ARM Cortex-M3 Processor that includes the low-power CPU.

The low-power CPU is shared by the sensor subsystem 108 and the location subsystem 110. In an example, program code (e.g., software applications and/or firmware) that enables sensing functionality and position-determining functionality are executed using the low-power CPU of the microcontroller 106. During the execution of this program code, the application processor 102 (or components of the application processor 102, such as a CPU of the application processor 102) can operate in a sleep mode, thus enabling energy savings in the device. In an example, in the sharing of the low-power CPU between the sensor subsystem 108 and the location subsystem 110, the low-power CPU is configured to process sensor data from the sensor subsystem 108 and satellite- and location-related data from the location subsystem 110 concurrently. The concurrent processing utilizes a parallel threading technique, in an embodiment. In an example, the concurrent processing is controlled using a priority-based scheduling algorithm that is executed by the low-power CPU. The priority-based scheduling algorithm determines an order in which program code is executed in the low-power CPU based on priorities of tasks associated with the program code. In an example, the algorithm schedules the use of the low-power CPU based on a real-time requirement (e.g., GNSS ACQ (acquisition) and TRK (tracking) have highest priority, and sampling and processing of sensor data has a lower priority). A software control module implementing the priority-based scheduling algorithm controls the priority and thread management, in an embodiment. In an example, the software control module is executed in the low-power CPU.

The low-power CPU is configured to read data from and write data to a volatile memory 208 that is part of the microcontroller 106. The volatile memory 208 is shared by the sensor subsystem 108 and the location subsystem 110. Thus, both sensor-related data from the sensor subsystem 108 and satellite- and location-related data from the location subsystem 110 are stored in the volatile memory 208. Similarly, both program code for processing sensor-related data and program code for processing satellite- and location-related data are stored in the volatile memory 208. As described in further detail below, because a storage capacity of the volatile memory 208 is finite, the sensor subsystem 108 and the location subsystem 110 must share the available storage capacity. For example, if the sensor subsystem 108 requires a large percentage of the storage capacity, the location subsystem 110 must utilize program code that requires only a small percentage of the storage capacity, and vice versa. In an example, a proportion of memory space allocated to each of the sensor subsystem 108 and the location subsystem 110 is based on a mode of operation of the mobile communications device. The low-power CPU of the microcontroller 106 is configured to execute program code stored in the volatile memory 208.

In an example, the volatile memory 208 is a relatively fast memory with a relatively small storage capacity. The volatile memory 208 comprises static random-access memory (SRAM) in an embodiment, or other suitable internal memory configurations. In an example, the volatile memory 208 is in relative close proximity to the low-power processor of the microcontroller 106. The volatile memory 208 may be known as "on-chip memory" or "internal memory" because it is co-located on a same chip, package, or device as the low-power CPU of the microcontroller 106, in examples.

In an example, the program code being executed by the low-power CPU of the microcontroller 106 is controlled by the application processor 106. Firmware is downloaded from the application processor 102 to the low-power CPU of the microcontroller 106, in an embodiment. In other examples, the application processor 102 is configured to select and transmit program code (e.g., for implementing software applications) to the volatile memory 208. In an example, the firmware or software program code is selected by the application processor 102 based on a mode of operation of the mobile communications device that is set by the application processor 102. Thus, for different applications and modes of operation, different firmware or software program code is downloaded from the application processor 102 and executed in the low-power CPU of the microcontroller 106.

In an example where firmware or software program code is selected by the application processor 102 based on a mode of operation set by the application processor 102, a dynamic download scheme is utilized. The volatile memory 208 has a storage capacity of 256 KB in an embodiment, and this storage capacity is shared between the sensor subsystem 108 and the location subsystem 110. In an example, the 256 KB capacity of the volatile memory 208 is not enough to support both multi-constellation navigation satellite measurement and complete processing of sensor data. To solve this problem, the dynamic download scheme is utilized, in an embodiment. When navigation service is triggered by the application processor 102 at full power (e.g., a mode of operation with a high GNSS performance requirement), a first reduced version of program code utilized by the sensor subsystem 108 is transmitted from the application processor 102 to the volatile memory 208. The first reduced version enables the sensor subsystem 108 to implement fundamental features (e.g., sensor drivers for ACC and light sensors, sensor HAL, 1K data buffer, pedometer, and motion detection) and consumes up to 10 KB of the 256 KB of the volatile memory 208 for required code and data. The remaining space of the volatile memory 208 is used to store program code and data related to the navigation service. The program code for the navigation service is transmitted from the application processor 102 to the volatile memory 208, in an example.

In the dynamic download scheme, when navigation service is triggered by the application processor 102 at partial power (e.g., a mode of operation with an intermediate or low GNSS performance requirement), a second reduced version of program code utilized by the sensor subsystem 108 is transmitted from the application processor 102 to the volatile memory 208. The second reduced version enables the sensor subsystem 108 to implement an expanded set of fundamental features (e.g., sensor drivers for ACC, light, gyroscope, magnetometer, barometer, and temperature sensors, sensor HAL, 10 KB data buffer, pedometer, motion and context detection) and consumes up to 30 KB of the 256 KB of the volatile memory 208 for required code and data. The remaining space of the volatile memory 208 is used to store program code and data related to the navigation service. The program code for the navigation service is transmitted from the application processor 102 to the volatile memory 208, in an example.

When navigation service is turned off by the application processor 102 (e.g., a mode of operation with no GNSS performance requirements), a complete version of program code utilized by the sensor subsystem 108 is transmitted from the application processor 102 to the volatile memory 208. The complete version enables the sensor subsystem 108 to implement a full set of features (e.g., sensor drivers for ACC, light, gyroscope, magnetometer, barometer, and temperature sensors, sensor HAL, flexible data buffer, pedometer, motion and context detection, online calibration, 6/9-axis fusion, etc.) and consumes up to 250 KB of the 256 KB of the volatile memory 208 for required code and data. It is noted that the dynamic download scheme described herein is an example only. In other examples, the application processor 102 is configured to set a mode of operation of the mobile communications device to another mode of operation not described above. The application processor 102 is further configured to transmit program code (e.g., firmware or software) to the low-power CPU or volatile memory 208 of the microcontroller 106, with the transmitted program code being selected based on the mode of operation.

The sensor subsystem 108 included in the microcontroller 106 is configured to provide aggregated access to a variety of sensors 230, 232, 234, 236, 238 via an I2C or SPI interface 228. In the example of FIG. 2, the sensors include an accelerometer 230, a gyroscope 232, a magnetometer 234, a barometer and/or temperature sensor 236, and a light sensor (e.g., an ambient light sensor) 238. Raw sensor data from the I2C or SPI interface 228 is received at a sensor driver module 226. The sensor driver module 226 may comprise program code executed in the low-power CPU of the microcontroller 106 that implements hardware-specific (e.g., sensor-specific) software provided by vendors of the sensors 230, 232, 234, 236, 238.

It is noted that the sensors 230, 232, 234, 236, 238 illustrated in FIG. 2 are only examples. The following table lists additional other sensors that may be used in conjunction with the systems and methods described herein:

TABLE 1

| Sensor Type | Description |
| --- | --- |
| TYPE ALL | all sensor types |
| TYPE ACCELEROMETER | an accelerometer sensor type |
| TYPE AMBIENT TEMPERATURES | an ambient temperature sensor type |
| TYPE GAME ROTATION VECTOR | an uncalibrated rotation vector sensor type |
| TYPE GEOMAGNETIC ROTATION VECTOR | a geo-magnetic rotation vector sensor type |
| TYPE GRAVITY | a gravity sensor type |
| TYPE. GYROSCOPE | a gyroscope senor type |
| TYPE GYROSCOPE UNCALIBRATED | an uncalibrated gyroscope sensor type |
| TYPE LIGHT | a light sensor type |
| TYPE LINEAR ACCELERATION | a linear acceleration sensor type |
| TYPE MAGNETIC FIELD | a magnetic field sensor type |
| TYPE MAGNETIC FILED UNCALIBRATED | an uncalibrated magnetic field sensor type |
| TYPE ORIENTATION | An orientation sensor type |
| TYPE PRESSURE | a pressure sensor type |
| TYPE PROXIMITY | a proximity sensor type |
| TYPE RELATIVE HUMIDITY | a relative humidity sensor type |
| TYPE ROTATION VECTOR | a rotation vector sensor type |
| TYPE SIGNIFICANT MOTION | a significant motion trigger sensor |
| TYPE STEP COUNTER | a step counter sensor |
| TYPE STEP DETECTOR | a step detector sensor |
| TYPE TEMPERATURE | a temperature sensor type |
| TYPE Walk distance | a sensor to measure total walking distance |
| TYPE Altitude | height fusion of GPS/Baro, non KK |

As illustrated in FIG. 2, the sensor subsystem 108 of the microcontroller 106 includes a "hub_HAL" module 222. The hub_HAL module 222 represents an interface between a framework (e.g., an Android framework) of the mobile communications device and the sensor driver module 226. The hub_HAL module 222 is a software layer that takes control of all of the sensors, e.g., by controlling open, close, sampling rate, and select the best batch parameters for each sensor. The hub_HAL module 222 is also used to fetch the sensor data from the sensors (e.g., using I2C). In an example, data generated at the sensor driver module 226, using the hardware-specific software provided by the vendors of the sensors, is received at a "hub_processing" module 224 of the sensor subsystem 108 via the hub_HAL module 222. In an example, the hub_processing module 224 of the sensor subsystem 108 is configured to process data received via the hub_HAL module 222 using the low-power CPU of the microcontroller 106.

The processing performed by the sensor subsystem 108 includes various types of low-level processing of sensor data, in an embodiment. Such low-level processing includes, in an example, continuous, "always on" sensor processing (e.g., step detection, motion detection). The continuous, "always on" sensor processing is executed in the low-power CPU of the microcontroller 106, without intervention from the application processor 102 and without waking a CPU of the application processor 102. By contrast, processing of sensor data that is more computationally complex is performed by the application processor 102, in an example. The processing performed by the sensor subsystem 108 also includes, in an example, batching the data of the sensors 230, 232, 234, 236, 238 using the low-power processor of the microcontroller

106. In another example, the processing includes fusing 6/9-axis motion sensors data using the low-power CPU of the microcontroller 106. In these examples, the CPU of the applications processor 102 that consumes a relatively high amount of power remains in a sleep mode during the processing in the low-power CPU.

The sensor subsystem 108 is also configured to assist the location subsystem 110 (e.g., in a geo-fencing application), in an embodiment. As described herein, the sensor subsystem 108 and the location subsystem 110 are embedded inside a single chip or IP. The single chip or IP, which utilizes an ARM Cortex-M3 Processor that includes a low-power CPU, in an example, is configured to consume a relatively low amount of power in the mobile communications device. The sensor subsystem 108 and the location subsystem 110 are able to cooperate to derive information indicative of a motion of the mobile communications device, thus enabling a low-power, hardware-based geo-fencing solution, in an embodiment. In an example, the sensor subsystem 108 receives acceleration and/or speed data from inertial sensors. The sensor subsystem 108 is configured to provide this information to the location subsystem 110. Such information is used by the location subsystem 110 to determine the user's dynamic range for satellite acquisition and reacquisition, in an embodiment.

In an example, the sensor subsystem 108 also controls the sampling of data from the sensors 230, 232, 234, 236, 238. The sensor subsystem 108 supports real-time polling of the sensors 230, 232, 234, 236, 238, in an embodiment. In an example, to poll the sensors 230, 232, 234, 236, 238, the sensor subsystem 108 transmits control data to the sensors 230, 232, 234, 236, 238, instructing the sensors to capture data and transmit the captured data to the hub_processing module 224.

The location subsystem 110 of the microcontroller 106 is coupled to a GNSS frontend 240. In an example, the GNSS frontend 240 is configured to provide to the location subsystem 110 one or more of the following types of positioning data: GNSS (i.e., satellite-based) positioning data, positioning data based on data sampled from motion sensors, positioning data based on a received WiFi signal, positioning data based on a received cellular signal, and positioning data based on other sources (e.g., radio sources). In the location subsystem 110, the different types of positioning data are processed via the low-power CPU of the microcontroller 106. The processing of this data includes combining (e.g., fusing) the data and/or results of the processing of the data to arrive at position information for the mobile communications device or intermediate measurements that are indicative of the position, in an embodiment. The application processor 102 and/or a CPU of the application processor 102 is configured to operate in a sleep mode during this processing of data by the location subsystem 110. In an embodiment, the position information or intermediate measurements are transmitted from the microcontroller 106 to the application processor via the interfaces 206, 220. The application processor 102 performs further processing on the position information or the intermediate measurements, in an example (e.g., processing the intermediate measurements to arrive at a final position of the device). The application processor 102 wakes a CPU of the application processor 102 (e.g., the first CPU 104 illustrated in FIG. 1 that consumes a relatively high amount of power) in order to perform the further processing.

FIG. 3 is a block diagram illustrating additional details of the location subsystem 110 of FIGS. 1 and 2. As shown in FIG. 3, the location subsystem 110 includes a frequency down-converter 304, an analog-to-digital converter (ADC) 306, baseband signal processing hardware 308, and software that is executed in the low-power, second CPU 112 of the microcontroller 106, in an example. It is noted that these components of the location subsystem 110 are examples only, and in other examples, the location subsystem 110 includes different components for implementing the functionality described herein. It is further noted that the block diagram of FIG. 3 is a simplified illustration of the location subsystem 110 and that the location subsystem 110 includes additional components in an embodiment.

The frequency-down converter 304 is configured to convert satellite signals received at the antenna 116 to an intermediate frequency (IF) or a baseband frequency. The ADC 306 receives the down-converted signals from the frequency down-converter 304 and generates digital data based on the down-converted signals. The baseband signal processing hardware 308, also known as a "correlator," receives the digital data (i.e., IF samples or baseband samples) from the ADC 306 and processes the digital data using the second CPU 112 to generate data indicative of a position of the mobile communications device.

In an example, using feedback control algorithms (implemented either as a part of the baseband signal processing hardware 308 or as a part of the processing in software executed in the second CPU 112), the location subsystem 110 generates estimates of the delay, phase, and frequency of the carrier and spreading code in the received signal. The generation of these estimates may be part of a "tracking" operation known to those of ordinary skill in the art. The location subsystem 110 is also used to generate the initial coarse estimates of these parameters, in an embodiment. The generation of these initial course estimates may be part of the "acquisition" operation known to those of ordinary skill in the art. In an example, the processing in the location subsystem 110, usually implemented in software executed in the low-power, second CPU 112, computes the Position-Velocity-Time (PVT) solution 310 for the device. In other examples, the PVT solution 310 is not computed by the location subsystem 110, and instead, only intermediate measurements are computed by the location subsystem 110. Further processing of the intermediate measurements (e.g., as carried out by the application processor 102 using the first CPU 104) is used to determine the final PVT solution for the device, in these examples.

In an example, the location subsystem 110 operates independently from the application processor 102 to generate location information. This may be known as a "stand-alone" mode of operation of the location subsystem 110. In other examples, the location subsystem 110 requests and receives additional information (e.g., aiding information) from the application processor 102. The location subsystem 110 uses the additional information in generating the location information for the mobile communications device.

Different software is downloaded from the application processor 102 to the microcontroller 106 based on a mode of operation of the mobile communications device, in an embodiment. In an example, the application processor 102 sets the mode of operation and transmits software to the volatile memory 208 based on the selected mode of operation. The low-power CPU 112 retrieves program code for this software from the volatile memory 108 and executes the program code, in an embodiment. The location subsystem 110 supports multiple low-power modes of operation. Depending on the mode that is selected, the power consumption of the location subsystem 110 varies from several milliamps (mA) to sub-milliamp (e.g., less than 1 mA). The operation in the different modes is controlled by software executed in the low-power, second CPU 112 of the microcontroller 106. For example, execution of first software causes the power consumption of the location subsystem 110 to be in the range of several milliamps, and execution of second software causes the power consumption of the location subsystem 110 to be in the sub-milliamp range, in an example. The different modes of operation are selected according to user scenarios, signal strengths, and power requirements, among other factors, in an example.

In an example illustrating different modes of operation of the location subsystem 110, in one mode of operation, the location subsystem 110 is configured to generate a final PVT solution for the mobile communications device. If the application processor 102 selects this mode of operation, the application processor 102 transmits to the volatile memory 208 a full version of program code that is executed in the low-power CPU 112 to determine the final PVT solution. The execution of the full version of the program code causes a power consumption of the location subsystem 110 to be at a first level (e.g., in the range of several milliamps). By contrast, in another mode of operation, the location subsystem 110 is not configured to generate the final PVT solution and instead only generates intermediate measurements that must be processed further to determine the PVT solution. If the application processor 102 selects this mode of operation, the application processor 102 transmits to the volatile memory 208 a reduced version of program code that is executed in the low-power CPU 112 to determine the intermediate measurements. The execution of the reduced version of the program code causes a power consumption of the location subsystem 110 to be at a second level that is less than the first level (e.g., in the sub-milliamp range). The intermediate measurements are transmitted to the application processor 102 for further processing (e.g., to determine the final PVT solution based on the intermediate measurements), in an embodiment. In an example, the determination as to whether location information should be generated entirely in the location subsystem 110 (e.g., without assistance from the application processor 102) or with assistance from the application processor 102 is made based on one or more factors. Such factors include requirements on position accuracy, a frequency with which position updates should be provided, and a power consumption requirement, among others.

Figure 4:
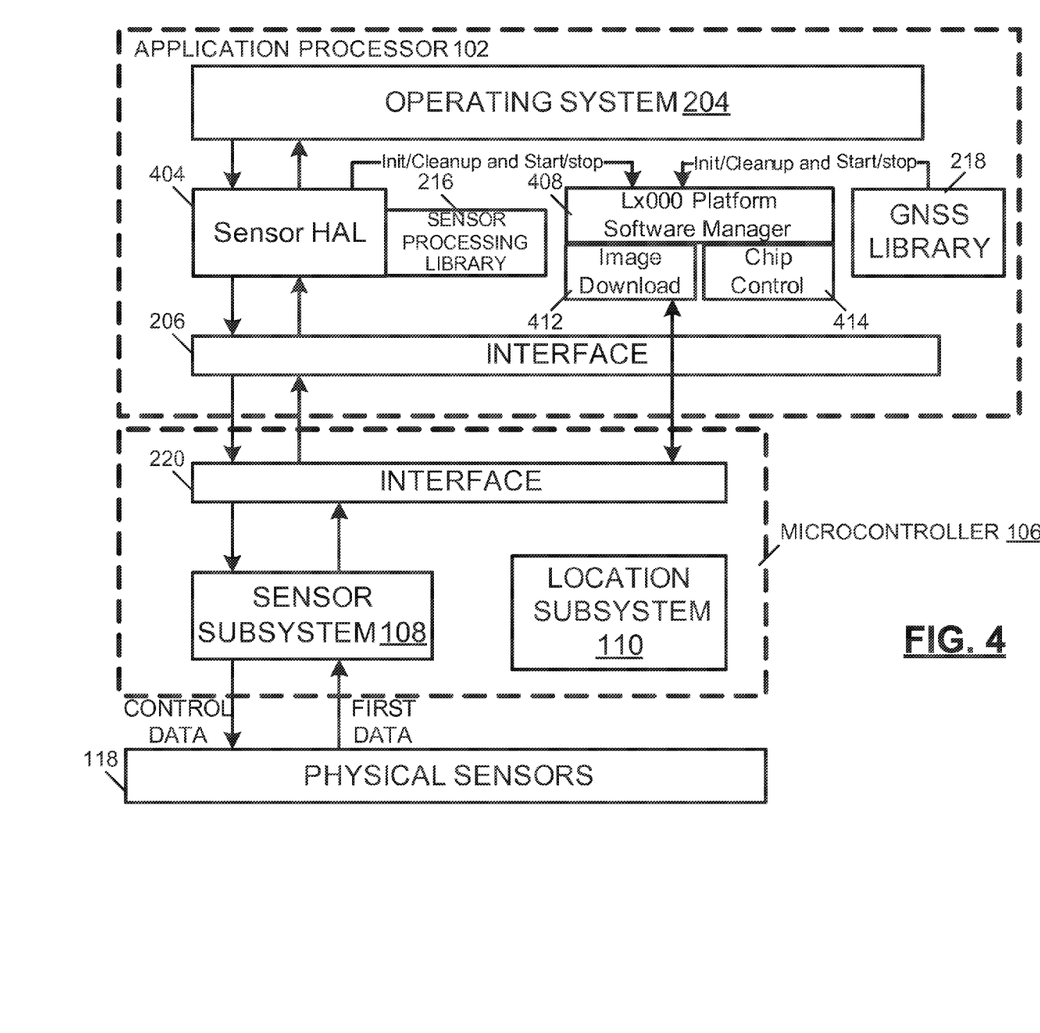
FIG. 4 is a block diagram of an architecture of an example mobile communications device.

FIG. 4 is a block diagram illustrating another example embodiment of the application processor 102 and the microcontroller 106 of FIG. 1. The block diagram of FIG. 4 includes components that are the same as (or similar to) components described above with reference to FIGS. 1-3. Such components are indicated using the same reference numerals as were used in FIGS. 1-3, and for brevity, the description of these components is not repeated. In the example of FIG. 4, the microcontroller 106 may be implemented using an ARM Cortex-M3 Processor that includes a low-power CPU. In the microcontroller 106, the sensor subsystem 108 is configured to collect data from the one or more physical sensors 118 and to provide control data to the sensors 118 for controlling the sensors, in an embodiment.

In the application processor 102, an M-socket driver is used in implementing the interface 206. The M-socket driver enables message transactions between the application processor 102 and the microcontroller 106. A "sensor HAL" module 404 of the application processor 102 is an upper layer interface (e.g., Android upper layer interface) of the operating system 204. The sensor HAL module 404 controls the M-socket interface 206 between the application processor 102 and the microcontroller 106, in an embodiment. The sensor HAL module 404 also maintains a state of the one or more sensors 118 and provides control data to the microcontroller 106 for configuring the one or more sensors 118, in an embodiment.

An Lx000 Platform Software Manager (LPM) module 408 of the application processor 102 is configured to receive input from the sensor HAL module 404 and the GNSS library 218. Based on such inputs, the LPM module 408 controls an image download module 412. The image download module 412 is configured to download images (e.g., library images) that are utilized by the microcontroller 106. An embedded firmware image running in the microcontroller 106 may include a GNSS-only version, a SensorHub-only version, or a GNSS/SensorHub combination version. This is illustrated in FIG. 4, which shows that the image download module 412 communicates images to the microcontroller 106 via the interfaces 206, 220, in an example. The LPM module 408 also controls a chip control module 414, in an embodiment. The chip control module 414 is configured to provide start/stop control to an Lx000 chip included as part of the application processor 102.

FIG. 5 depicts a system-on-chip (SOC) 504 including exemplary components for implementing the sensor subsystem 108 and location subsystem 110 described herein. In FIG. 5, satellite signals (e.g., GNSS signals or GPS signals) are received at a GPS/GNSS radio frequency integrated circuit (RFIC) 502. In an example, the GPS/GNSS RFIC 502 is configured to convert satellite signals from a radio frequency to an intermediate frequency (IF) or a baseband frequency. The down-converted signals are transmitted to an ADC 508 that is disposed on the SOC 504. The ADC 508 is configured to generate digital data based on the down-converted signals. GNSS baseband signal processing hardware 510 receives the digital data from the ADC 508 and processes the digital data using a low-power CPU 512 (e.g., an ARM Cortex M3 Processor).

A bus 520 and bus multiplexer 514 are utilized to pass the digital data from the baseband processor 510 to a volatile memory 516. In an example, the volatile memory 516 is SRAM having a storage capacity of 256 KB. The volatile memory 516 is configured to store the (i) data, and (ii) program code executed by the low-power CPU 512 in processing the data. The low-power CPU 512 accesses the data to be processed and program code from the volatile memory 516 via the bus multiplexer 514. As illustrated in FIG. 5, the GNSS baseband hardware 510, low-power CPU 512, bus multiplexer 514, bus 520, and volatile memory 516 are formed on an IP core 506 that is disposed on the SOC 504, in an embodiment. The SOC 504 further includes a sensor data collection controller 518 configured to control sampling of data from sensors 118 of the mobile communications device. Although the example of FIG. 5 depicts the sensor data collection controller 518 as not being disposed on the IP core 506, in other examples, the sensor data collection controller 518 is included as part of the IP core 506.

Based on the particular tasks that are to be performed by the SOC 504, different components of the SOC 504 are turned on and off separately, as required. For example, in one mode of operation, the GNSS RFIC 502 is turned off (i.e., disabled) while other components remain turned on and operational. In other examples, one or more of the GNSS baseband hardware 510, sensors data collection controller 518, and peripheral engine are turned off and on independently of other components. In these examples, the various components of the SOC 504 are configured to operate independently of one another, and each of the components is configured to be disabled without affecting operation of other components.

Figure 6:
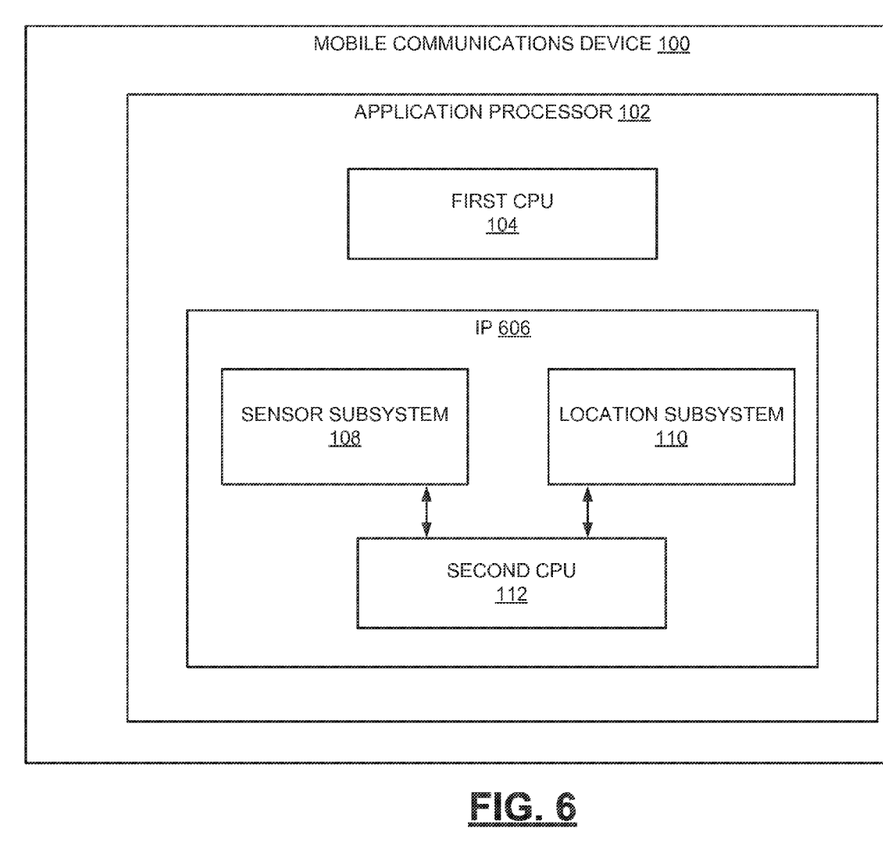
FIG. 6 depicts an IP core that integrates together the sensor subsystem and the location subsystem described with reference to FIGS. 1-5.

FIG. 6 depicts an IP core 606 that integrates together the sensor subsystem 108 and the location subsystem 110 described above with reference to FIGS. 1-5. As described herein, the sensor subsystem 108 and the location subsystem 110 are formed within a single chip or IP core. In FIG. 6, the sensor subsystem 108 and the location subsystem 110 are disposed within a single IP core 606 that is disposed on a same chip as the application processor 102. In other examples, the IP core 606 is disposed on a different chip that is separate from and coupled to the chip on which the application processor 102 is formed.

Figure 7:
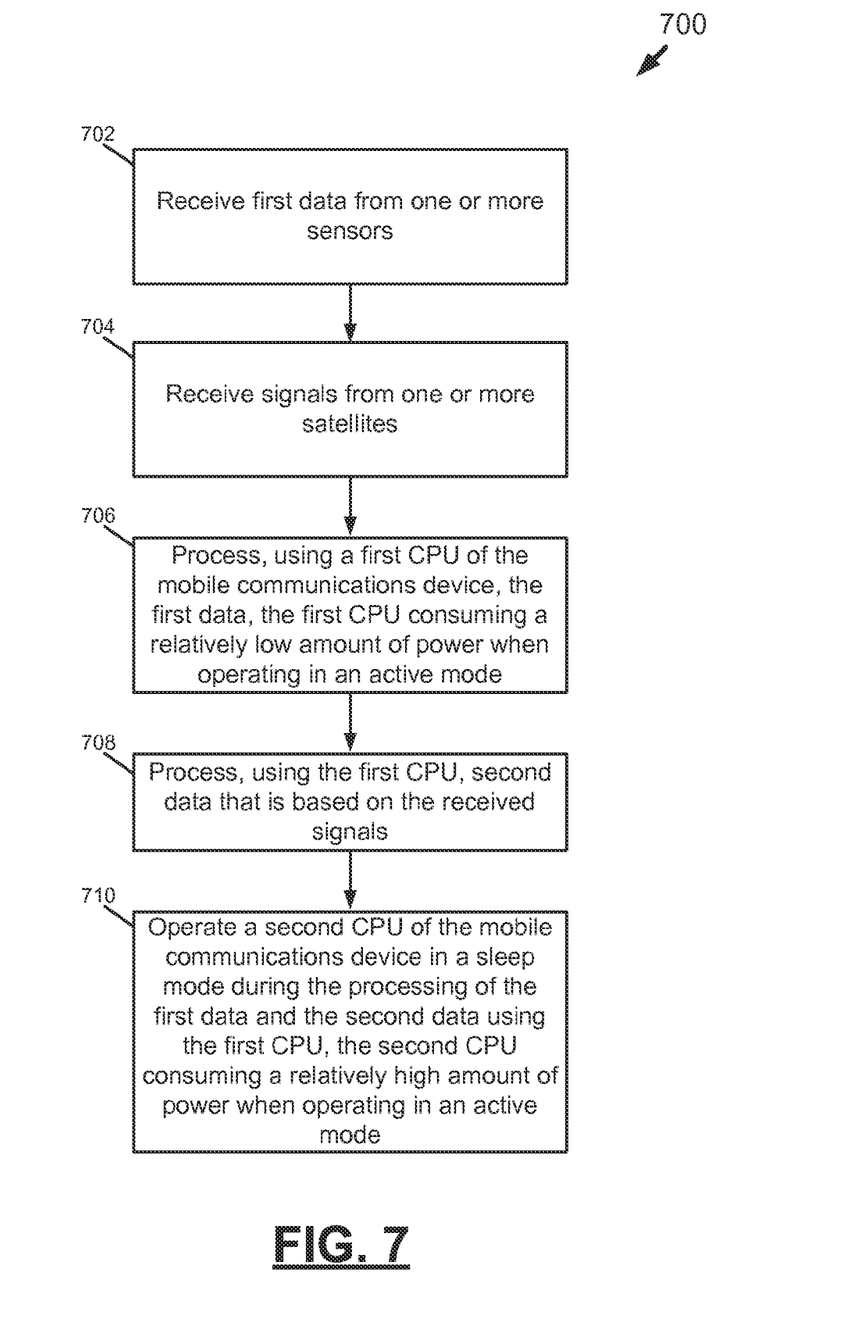
FIG. 7 is a flowchart illustrating an example method for reducing energy usage in a mobile communications device.

FIG. 7 is a flowchart 700 illustrating an example method for reducing energy usage in a mobile communications device. At 702, first data is received from one or more sensors. At 704, signals are received from one or more satellites. At 706, the first data is processed using the first CPU of the mobile communications device, where the first CPU consumes a relatively low amount of power when operating in an active mode. At 708, second data that is based on the received signals is processed using the first CPU. At 710, a second CPU of the mobile communications device is operated in a sleep mode during the processing of the first data and the second data using the first CPU. The second CPU consumes a relatively high amount of power when operating in an active mode.

This written description uses examples to disclose the invention, including the best mode, and also to enable a person skilled in the art to make and use the invention. The patentable scope of the invention includes other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A mobile communications device comprising:
    an application processor including a first central processing unit (CPU), the first CPU consuming a relatively high amount of power when operating in an active mode; and
    a microcontroller coupled to the application processor and comprising:
        a sensor subsystem configured to process, using a second CPU, first data received from one or more sensors, the second CPU being different from the first CPU and consuming a relatively low amount of power when operating in an active mode, and
        a location subsystem configured to (i) receive signals from one or more satellites, and (ii) process, using the second CPU, second data that is based on the received signals,
    wherein the first CPU is configured to operate in a sleep mode during the processing of the first data and the second data using the second CPU.

2. The mobile communications device of claim 1, wherein the sensor subsystem and the location subsystem are respectively configured to transmit results of the processing of the first data or the second data to the application processor, and wherein the first CPU is configured to exit the sleep mode and perform additional processing on the results.

3. The mobile communications device of claim 1, wherein the sensor subsystem is configured to periodically or continuously read and process the first data from the one or more sensors without intervention from the application processor and without waking the first CPU from the sleep mode.

4. The mobile communications device of claim 1, wherein the sensor subsystem and the location subsystem are respectively configured to operate independently of one another, and wherein each of the sensor subsystem and the location subsystem is configured to be disabled without affecting operation of the other subsystem.

5. The mobile communications device of claim 1,
    wherein the location subsystem includes (i) a frequency down-converter configured to convert the signals received from the one or more satellites to an intermediate frequency (IF) or a baseband frequency, (ii) an analog-to-digital converter configured to generate digital data based on the down-converted signals, and (iii) a baseband processor configured to process, using the second CPU, the digital data to generate data indicative of a position of the mobile communications device.

6. The mobile communications device of claim 1, wherein the location subsystem is configured to determine a position of the mobile communications device based on the processing of the second data, the position being determined without intervention or assistance from the application processor and without waking the first CPU from the sleep mode.

7. The mobile communications device of claim 1, wherein the location subsystem is configured to determine a position of the mobile communications device based on (i) the processing of the second data, and (ii) additional information or assistance from the application processor.

8. The mobile communications device of claim 1,
wherein the location subsystem is configured to (i) generate intermediate data based on the processing of the second data, and (ii) transmit to the application processor the intermediate data, and
wherein the application processor is configured to (i) wake the first CPU from the sleep mode, and (ii) determine a position of the mobile communications device by processing the intermediate data using the first CPU.

9. The mobile communications device of claim 1, wherein the sensor subsystem is configured to (i) receive the first data, (ii) process the first data using the second CPU, and (iii) transmit to the one or more sensors control data configured to control an operation of the one or more sensors, the receiving, processing, and transmitting being performed without intervention or assistance from the application processor and without waking the first CPU from the sleep mode.

10. The mobile communications device of claim 1, wherein the second CPU is configured to process the first data and the second data concurrently, the concurrent processing being controlled based on a priority-based scheduling algorithm executed by the second CPU, the priority-based scheduling algorithm determining an order in which program code is executed in the second CPU based on priorities of tasks associated with the program code.

11. The mobile communications device of claim 1, wherein the microcontroller further comprises:
a volatile memory accessible by the second CPU, the volatile memory being configured to store program code used in processing the first data and the second data, wherein the application processor is configured to (i) set a mode of operation of the mobile communications device, and (ii) transmit the program code to the volatile memory, the transmitted program code being selected by the application processor based on the mode of operation.

12. The mobile communications device of claim 11, wherein the application processor is configured to:
set the mode of operation of the mobile communications device to a first mode, the location subsystem being disabled in the first mode;
based on the setting of the mode of operation to the first mode, transmit to the volatile memory a full version of program code utilized by the sensor subsystem in the processing of the first data, the full version consuming a first amount of space in the volatile memory;
set the mode of operation of the mobile communications device to a second mode, the location subsystem being enabled in the second mode; and
based on the setting of the mode of operation to the second mode, transmit to the volatile memory a reduced version of the program code utilized by the sensor subsystem in the processing of the first data, the reduced version consuming a second amount of space in the volatile memory that is less than the first amount.

13. A method for reducing energy usage in a mobile communications device, the method comprising:
receiving first data from one or more sensors;
receiving signals from one or more satellites;
processing, using a first central processing unit (CPU) of the mobile communications device, the first data, the first CPU consuming a relatively low amount of power when operating in an active mode;
processing, using the first CPU, second data that is based on the received signals; and
operating a second CPU of the mobile communications device in a sleep mode during the processing of the first data and the second data using the first CPU, the second CPU consuming a relatively high amount of power when operating in an active mode.

14. The method of claim 13, further comprising:
transmitting results of the processing of the first data or the second data from a microcontroller of the mobile communications device to an application processor of the mobile communications device, the microcontroller (i) including the first CPU, and (ii) being coupled to the application processor, wherein the application processor includes the second CPU;
waking the second CPU from the sleep mode; and
processing, using the second CPU, the results after the waking of the second CPU from the sleep mode.

15. The method of claim 13, further comprising:
determining a position of the mobile communications device based on the processing of the second data, the position being determined without intervention or assistance from the second CPU.

16. The method of claim 13, wherein the processing of the first data includes:
periodically or continuously reading the first data from the one or more sensors without waking the second CPU from the sleep mode.

17. The method of claim 13, further comprising:
determining a position of the mobile communications device based on (i) the processing of the second data, and (ii) additional information or assistance from the second CPU.

18. The method of claim 13, wherein the processing of the first data and the second data occurs concurrently, the concurrent processing being controlled based on a priority-based scheduling algorithm executed by the first CPU, the priority-based scheduling algorithm determining an order in which program code is executed in the first CPU based on priorities of tasks associated with the program code.

19. The method of claim 13, further comprising:
setting the mode of operation of the mobile communications device to a first mode;
based on the setting of the mode of operation to the first mode, executing in the first CPU a full version of program code for the processing of the first data, the full version consuming a first amount of space in a memory;
setting the mode of operation of the mobile communications device to a second mode; and
based on the setting of the mode of operation to the second mode, executing in the first CPU a reduced version of the program code for the processing of the first data, the reduced version consuming a second amount of space in the memory that is less than the first amount.

20. The method of claim 13, wherein the first data is indicative of a movement of the mobile communications device or an environment in which the mobile communications device is operating, and wherein the processing of the second data generates data indicative of a position of the mobile communications device.

* * * * *